(12) United States Patent
Klossok

(10) Patent No.: US 12,042,934 B1
(45) Date of Patent: Jul. 23, 2024

(54) SUPPORT SYSTEMS AND METHODS FOR ROBOT ARM ASSEMBLY

(71) Applicant: Tiger Tool International Incorporated, Abbotsford (CA)

(72) Inventor: Rudolf Maksymilian Klossok, Coquitlam (CA)

(73) Assignee: Tiger Tool International Incorporated, Abbotsford (CA)

( * ) Notice: Subject to any disclaimer, the term of this patent is extended or adjusted under 35 U.S.C. 154(b) by 0 days.

(21) Appl. No.: 18/055,735

(22) Filed: Nov. 15, 2022

Related U.S. Application Data

(60) Provisional application No. 63/279,377, filed on Nov. 15, 2021.

(51) Int. Cl.
*B25J 9/00* (2006.01)
*F16M 11/20* (2006.01)

(52) U.S. Cl.
CPC ........ *B25J 9/0009* (2013.01); *F16M 11/2007* (2013.01); *F16M 2200/021* (2013.01)

(58) Field of Classification Search
CPC ............... B25J 9/0009; F16M 11/2007; F16M 2200/021; A61B 34/30
USPC .............. 74/90.01; 901/27; 248/658, 222.13, 248/222.14, 131, 125.7, 406.1, 418, 425
See application file for complete search history.

(56) References Cited

U.S. PATENT DOCUMENTS

| | | | |
|---|---|---|---|
| 10,363,856 B1* | 7/2019 | Talke | B60P 1/64 |
| 2007/0080266 A1* | 4/2007 | Oddsen | F16M 11/10 248/125.7 |
| 2009/0071281 A1* | 3/2009 | Fisk | B25J 19/023 901/29 |
| 2014/0010525 A1* | 1/2014 | Chapman | F16M 11/2057 396/428 |
| 2017/0182669 A1* | 6/2017 | Bordegnoni | B25J 18/04 |
| 2020/0038985 A1* | 2/2020 | Inoue | B25J 19/0029 |
| 2020/0253678 A1* | 8/2020 | Hulford | A61B 34/25 |

* cited by examiner

*Primary Examiner* — Bradley Duckworth
(74) *Attorney, Agent, or Firm* — Michael R. Schacht; Schacht Law Office, Inc.

(57) ABSTRACT

A support system for supporting a robot arm system in an operating configuration and a stowed configuration relative to a workspace comprises a base assembly and a platform assembly. The base assembly is adapted to be secured to a structural surface, the base assembly defining a pivot opening. The platform assembly adapted to support the robot arm system, the platform assembly comprising a pivot member. The pivot opening is sized and dimensioned to receive the pivot member such that the platform assembly is movable between the operating configuration and the stowed configuration relative to the workspace.

19 Claims, 10 Drawing Sheets

SUPPORT SYSTEMS AND METHODS FOR ROBOT ARM ASSEMBLY

RELATED APPLICATIONS

This application, U.S. patent application Ser. No. 18/055,735 filed Nov. 15, 2022, claims benefit of U.S. Provisional Application Ser. No. 63/279,377 filed Nov. 15, 2021, the contents of which are incorporated herein by reference.

TECHNICAL FIELD

The present invention relates to robot arm assemblies and, in particular, to support systems and methods for robot arm assemblies.

BACKGROUND

Robot tool support systems and methods are commonly used in manufacturing and other industries to support a robot system to move a tool as necessary to perform a tool task. One example of a robot system is a robot arm system that is segmented to allow movement of a tool in multiple axes. The present invention is of particular significance in the context of a robot arm system, and that application of the present invention will be described in detail herein. However, the present invention has application to other robotic tool support systems, and the scope of the present invention should be determined based on the claims appended hereto and not the following detailed description.

A robot arm system is typically configured to support a tool for movement within a predetermined three-dimensional workspace. A control system is typically programmed to control the robot arm system to form one or more desired tasks. The robot arm system is typically arranged in a predetermined working orientation relative to the workspace to allow the control system to control the robot arm system to move within that workspace to perform the desired task(s).

When the robot arm system is in the working orientation relative to the workspace, human access to the workspace is typically limited. Accordingly, robot arm systems are commonly mounted on stands or carts that may be moved away from the working orientation to facilitate human access to the workspace for tasks such as cleaning, maintenance, material loading, part removal, and the like. However, after the human task has been completed, the robot arm system must be moved back into the working orientation relative to the workspace before the robot arm system may be used to perform the desired task(s).

The need thus exists for support systems and methods for robot arm assemblies that facilitate the movement of a robot arm assembly into and out of a working orientation relative to a workspace.

SUMMARY

The present invention may be embodied as a support system for supporting a robot arm system in an operating configuration and a stowed configuration relative to a workspace. The support system comprises a base assembly and a platform assembly. The base assembly is adapted to be secured to a structural surface, the base assembly defining a pivot opening. The platform assembly adapted to support the robot arm system, the platform assembly comprising a pivot member. The pivot opening is sized and dimensioned to receive the pivot member such that the platform assembly is movable between the operating configuration and the stowed configuration relative to the workspace.

The present invention may also be embodied as a method of supporting a robot arm system in an operating configuration and a stowed configuration relative to a workspace, the method comprising the following steps. A base assembly defining a pivot opening is provided. The base assembly is secured to a structural surface. A platform assembly comprising a pivot member is provided, where the pivot opening is sized and dimensioned to receive the pivot member. The platform assembly is arranged relative to the base assembly such that the pivot opening receives the pivot member such that the platform assembly is movable relative to the base assembly. The robot arm system is supported on the platform assembly. The platform assembly is moved relative to the base assembly to move the robot arm system between the operating configuration and the stowed configuration relative to the workspace.

The present invention may also be embodied as a support system for supporting a robot arm system in an operating configuration and a stowed configuration relative to a workspace. In this example, the support system comprises a base assembly, a platform assembly, and a fixing assembly. The base assembly is adapted to be secured to a structural surface and defines a pivot opening. The platform assembly is adapted to support the robot arm system and comprises a pivot member. The fixing assembly fixes a location of the platform assembly relative to the base assembly. The pivot opening is sized and dimensioned to receive the pivot member such that the platform assembly is movable between the operating configuration and the stowed configuration relative to the workspace. The fixing assembly is configured to fix the platform assembly in the operating configuration.

DETAILED DESCRIPTION

Figure 1:
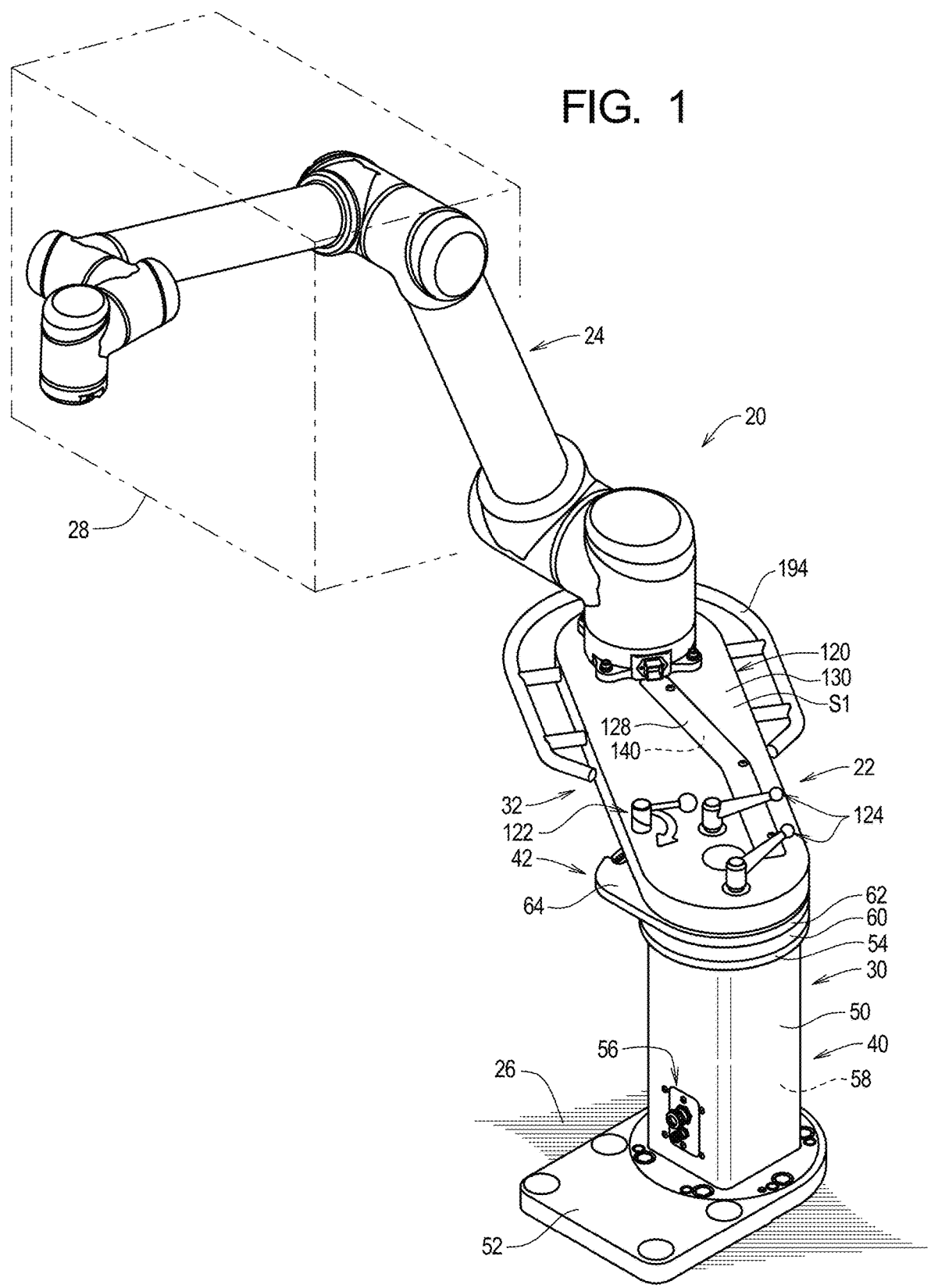
FIG. 1 is a perspective view of a first example support system of the present invention supporting a robot arm system.
Figure 2:
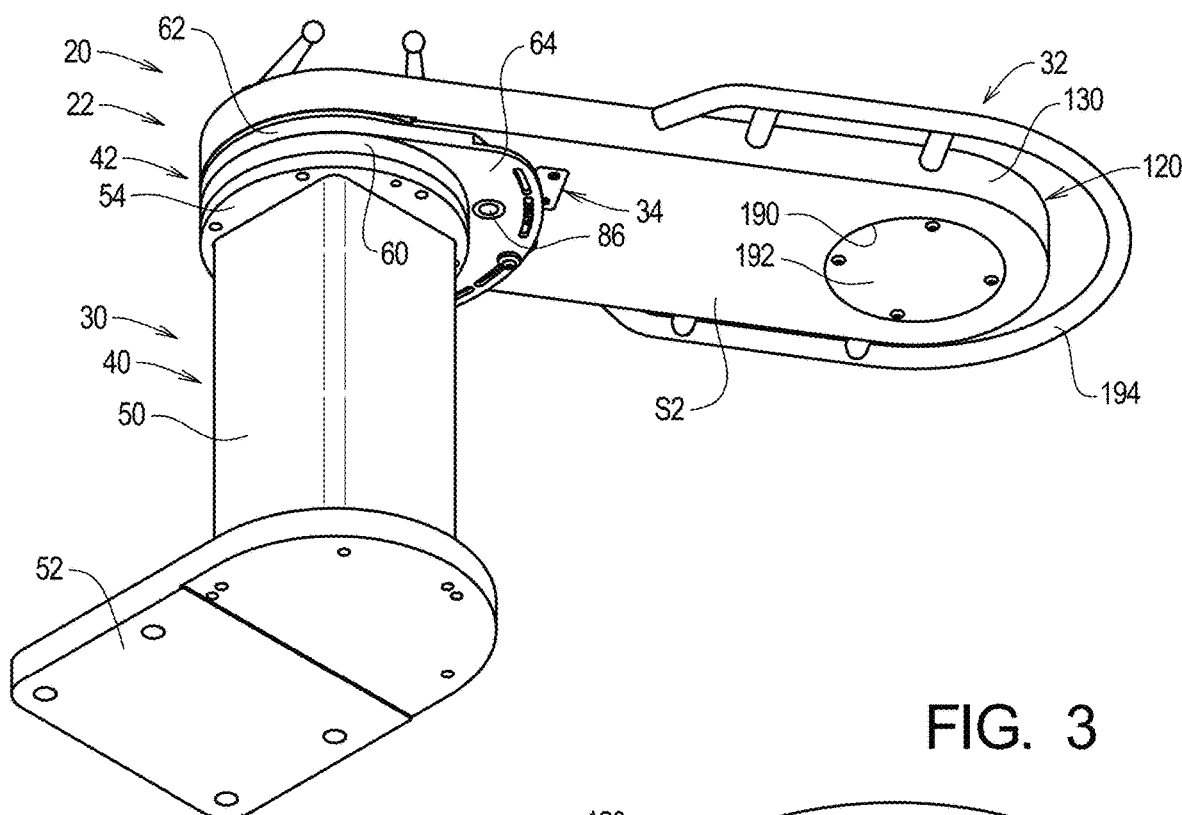
FIG. 2 is a first bottom perspective view of the first example support system.
Figure 3:
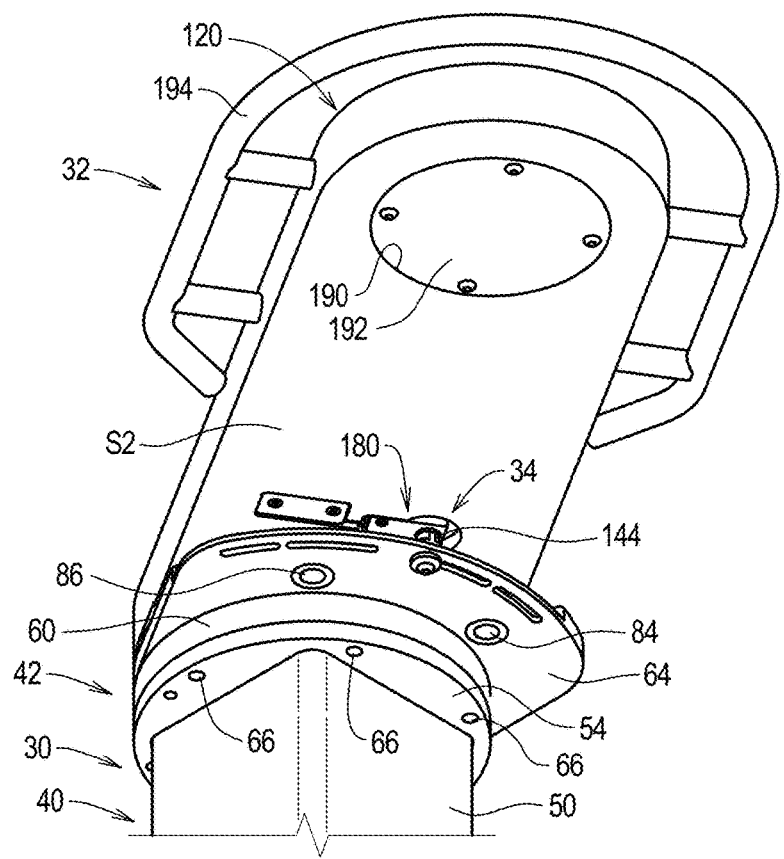
FIG. 3 is a second bottom perspective view of the first example support system.
Figure 4:
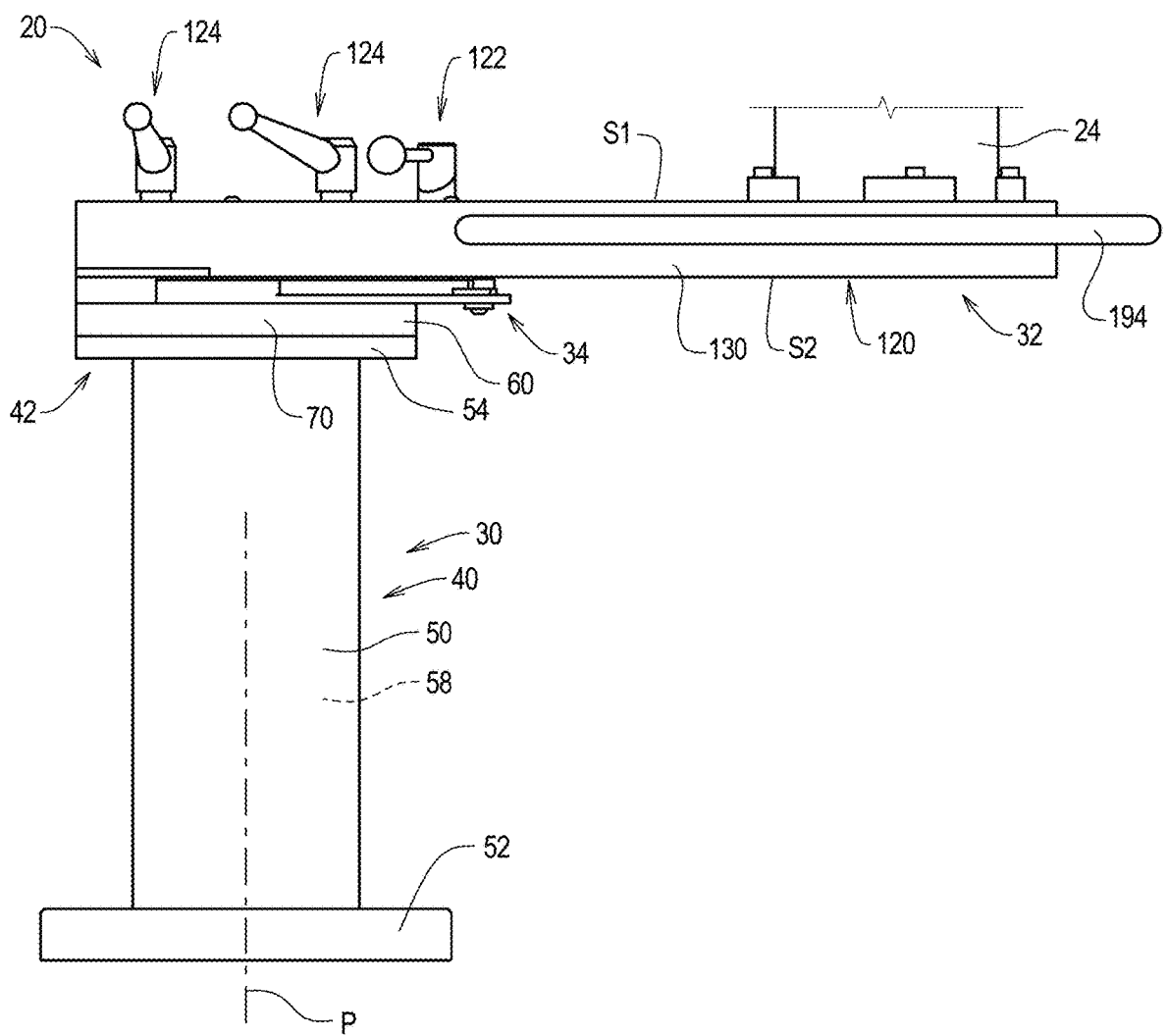
FIG. 4 is a side elevation view of the first example support system.
Figure 5:
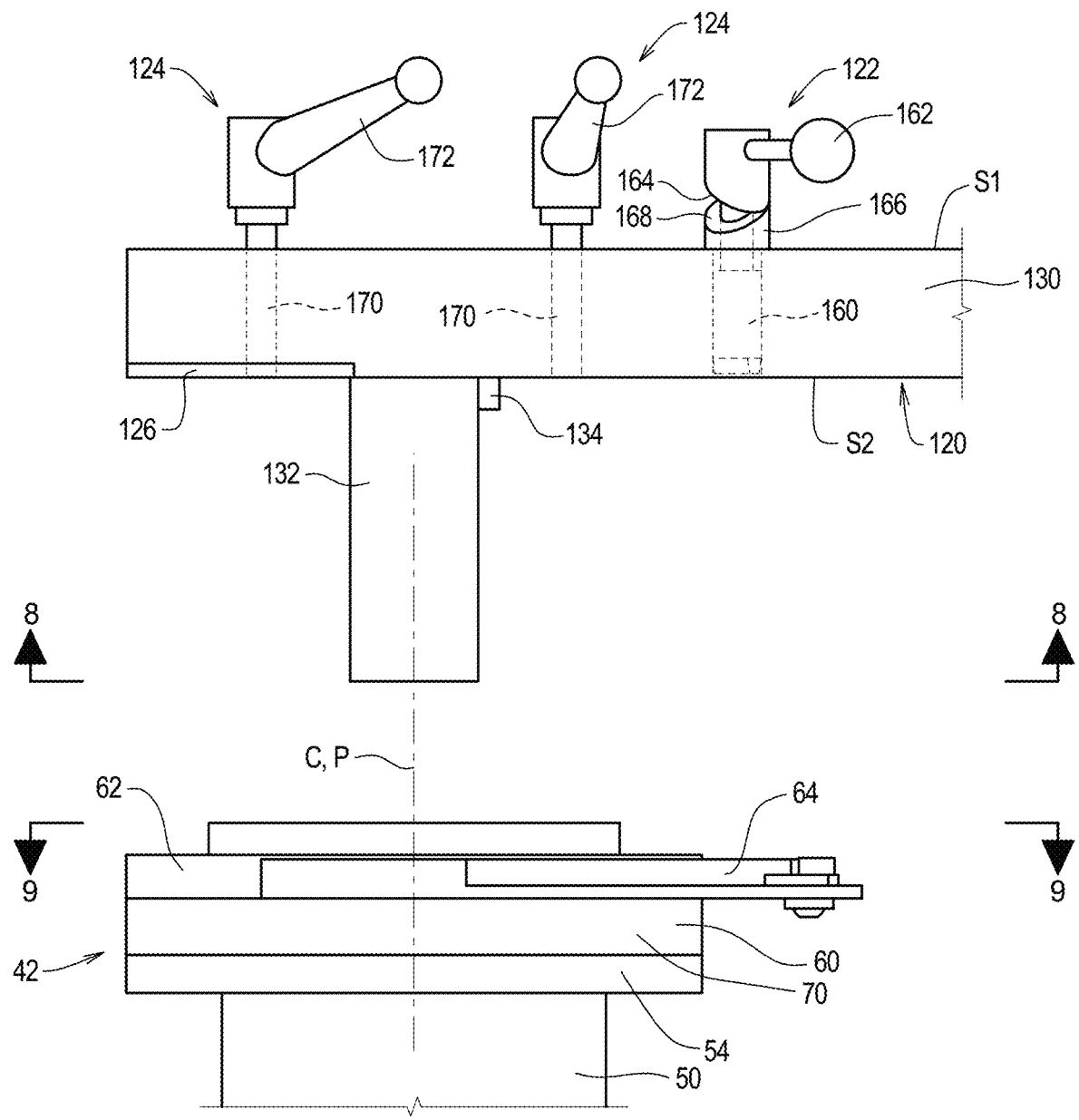
FIG. 5 is a side elevation exploded partial view of a portion the first example support system illustrating an example platform assembly and a first example base assembly of the first example support system, the example platform assembly being in a first configuration.
Figure 6:
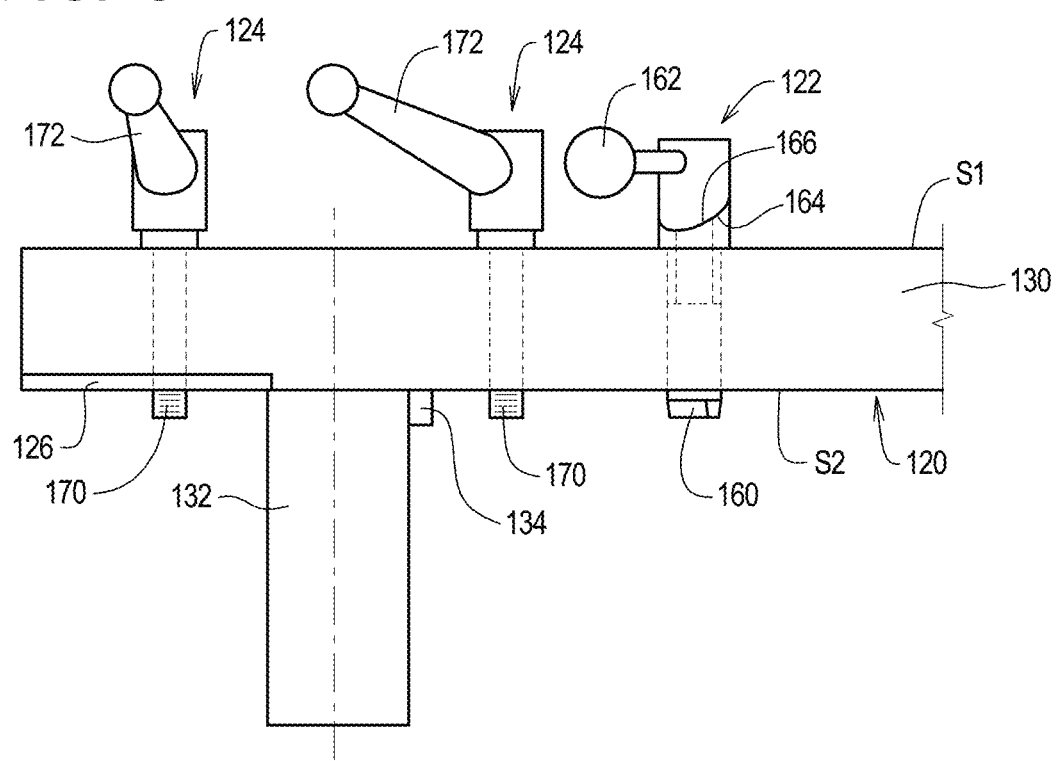
FIG. 6 is a side elevation view of the example platform assembly in a second configuration.

Referring initially to FIG. 1 of the drawing, depicted therein is a robot system 20 comprising an example support system 22 and an example robot arm system 24. The example support system 22 is configured to support the robot arm system 24 from a structural surface 26 such as a floor. The example robot arm system 24 is or may be conventional and will be described herein only to that extent helpful to an understanding of the example robot system 20 and example support system 22 of the present invention.

The example robot arm system 24 is capable of moving a tool (not shown) in free space to perform one or more tasks as programmed by a controller (not shown). To allow the robot system 20 to be controlled to perform a desired task, the example robot arm 24 must be arranged in a predetermined location and orientation relative to a particular three-dimensional workspace 28 in which the robot arm 24 must perform a particular task. The example support system 22 allows a base of the robot arm 24 to be displaced between an operating position in which the robot arm 24 is located and oriented in a predetermined location and orientation, referred to herein as the operating configuration, relative to the particular workspace 28 to perform a particular task and a stowed configuration in which the robot arm 24 is displaced away from the particular workspace 28.

As an example, when in the operating configuration, the robot arm 24 may be controlled to pick and place workpieces being milled by a milling machine (not shown). But to allow access to the milling machine for maintenance, repair, and/or milling of parts without assistance of the robot arm 24, the support system 22 may be placed in the stowed configuration in which the robot arm 24 is moved away from the workspace 28.

As shown in FIGS. 1-5 and 7, the example support system 24 comprises a first example base assembly 30, an example platform assembly 32, and an example locating system 34. The example base assembly 30 is secured relative to a desired location. The platform assembly 32 is supported by the base assembly movement between an operating position and a stowed position. The robot arm system 24 is in turn supported by the platform assembly 32. The locating system 34 is configured to detect whether the platform assembly 30 is in the operating position and, if the platform assembly 32 is not in the operating position, to prevent operation of the robot arm system 24.

Turning now to FIGS. 1-5, 7, and 9-13, the first example base assembly 30 will be described in detail. The first example base assembly 30 comprises a pedestal assembly 40 and a bearing plate assembly 42. The example pedestal assembly 40 comprises a column 50, a bottom plate 52, and a top plate 54. The example pedestal assembly 40 further comprises an example connector assembly 56 mounted in the column 50 adjacent to the bottom plate 52. The example column 52 is a hollow, cylindrical member defining a pedestal chamber 58 and a pedestal axis P. The example bottom plate 52 is rigidly connected to the column 50 and is adapted to be rigidly connected to the structural surface 26 as depicted in FIG. 1. The example top plate 54 is rigidly connected to the column 50 and is annular to allow access to the pedestal chamber 58. The example top plate is further adapted to support the bearing plate assembly 42 as will be described in further detail below. The example connector assembly 56 allows wiring (not shown) to be extended through the pedestal chamber 58 to allow the robot controller to be electrically connected to the robot arm system 24 as will be described in further detail below.

The example bearing plate assembly 42 comprises a pivot ring 60, a bearing ring 62, a locating structure 64, and pivot ring bolts 66, and bearing ring bolts 68. The example locating structure 64 is integrally formed with the example bearing ring 62 but may be rigidly connected to the example bearing ring 62. The pivot ring bolts 66 and the bearing ring bolts 68 are arranged such that the bearing ring 62 is rigidly secured relative to the top plate 54 of the pedestal assembly 40 during use as will be described in further detail below.

The example pivot ring 60 comprises an annular portion 70 and a collar portion 72. The example annular portion 70 is configured to be rigidly supported by the top plate 54 of the pedestal assembly 40 such that the example collar portion 72 is rigidly supported within the annular portion 70 above the pedestal chamber 58. At least one stop wing 74 extends from the example collar portion 72. The example collar portion 72 further defines a cylindrical pivot opening 76 that, when the annular portion 70 is rigidly supported by the pedestal assembly 40, a longitudinal axis defined by the pivot opening 76 is coaxially aligned with the pedestal axis P defined by the column 50.

The example bearing ring 62 defines a bearing surface 80 and a guide ring 82. The example bearing surface 80 is configured to engage the example platform assembly 32 to transmit vertical loads from the example platform assembly 32 to the pedestal assembly 40 through the pivot ring 60. The example guide ring 82 defines at least one pedestal guide surface configured to engage the example platform assembly 32 to limit movement of the example platform assembly 32 as will be described in further detail below. The example guide ring 82 of the example bearing ring 62 defines first and second locating openings 84 and 86 and at least one anchor opening 88. The example locating structure 64 defines two or more anchor openings 88.

When the annular portion 70 is rigidly supported by the pedestal assembly 40 such that the longitudinal axis defined by the pivot opening 76 is coaxially aligned with the pedestal axis P defined by the column 50, a pedestal wiring upper portal 90 is formed on one side of the stop wings 74 and a stop chamber 92 is formed on an opposite side of the stop wings 74. The pedestal wiring upper portal 90 is arranged to allow wiring to be passed from the pedestal chamber 58 through the bearing plate assembly 42.

To assemble the example pedestal assembly 40, the pivot ring bolts 66 are arranged through the bottom of the top plate 54 (see, e.g., FIGS. 3 and 4) to rigidly secure the annular portion 70 of pivot ring 60 to the top plate 54, and the bearing ring bolts 68 are arranged to rigidly secure the bearing plate 62 to the pivot ring 60 (see, e.g., FIGS. 7 and 9-13). The use of six evenly spaced bearing ring bolts 68 as shown in FIGS. 7 and 9-13 allows the example bearing ring 62 to be arranged at six different angular positions relative to the pedestal assembly 40 and the pivot ring 60. These six spaced angular positions allow gross adjustment of the example platform assembly 32 relative to the workspace 28 in which the robot arm system 24 is intended to operate.

FIGS. 1-8 illustrate the example platform assembly 32. The example platform assembly 32 comprises a platform member 120, at least one cam locator assembly 122, at least one anchor bolt assembly 124, a bearing ring 126, and a chase cover plate 128.

The example platform member 120 defines a support portion 130, a pivot member 132, at least one stop projection 134, and a platform guide recess 136 defining at least one platform guide surface 138. The example support portion 130 is in the shape of an elongate oval defining a lateral axis L, an upper surface S1, and a lower surface S2. The example pivot member 132, the example stop projection 134, and the example guide recess 136 extend from the lower surface S2 of the example platform member 120. The example pivot member 132 defines a cylinder axis C that extends at substantially a right angle to a plane defined by the upper surface S1.

A wiring chase 140 is formed in the upper surface S1 of the support portion 130, a platform wiring portal 142 extends between the upper surface S1 and the lower surface S2 of the support portion 130, and a sensor notch 144 is formed in the lower surfaces S2 of the support portion 130. The wiring chase 140 allows wires to extend from the platform wiring portal 142 to the sensor notch 144 and from the sensor notch 144 to the robot arm system 24. The chase cover plate 128 is arranged to cover the wiring chase 140 to protect any wires contained therein.

The platform member 120 further defines a bearing ring notch 150 sized and dimensioned to receive the bearing ring 126. Bearing ring fasteners 152 are arranged to secure the bearing ring 126 within the bearing ring notch 150.

The at least one example cam locator assembly 122 comprises a cam pin 160, a cam handle 162 defining a first cam surface 164, and a cam pedestal 166 defining a second cam surface 168. Rotating the cam handle 162 causes first and second cam surfaces 164 and 168 to engage each other such that the cam pin 160 axially moves between a retracted position (FIG. 5) and an extended position (FIG. 6) relative to the platform member 120.

Each of the example anchor bolt assemblies 124 comprises an anchor bolt 170 and an anchor bolt handle 172. The example anchor bolt 170 is threaded such that axial rotation of the anchor bolt 170 displaces the anchor bolt 170 along its longitudinal axis relative to the platform member 120. The example anchor bolt handle is rigidly connected to the anchor bolt 170 to facilitate axial rotation of the anchor bolt 170. The anchor bolts 170 are depicted in a retracted position in FIG. 5 and an extended position in FIG. 6.

Figure 7:
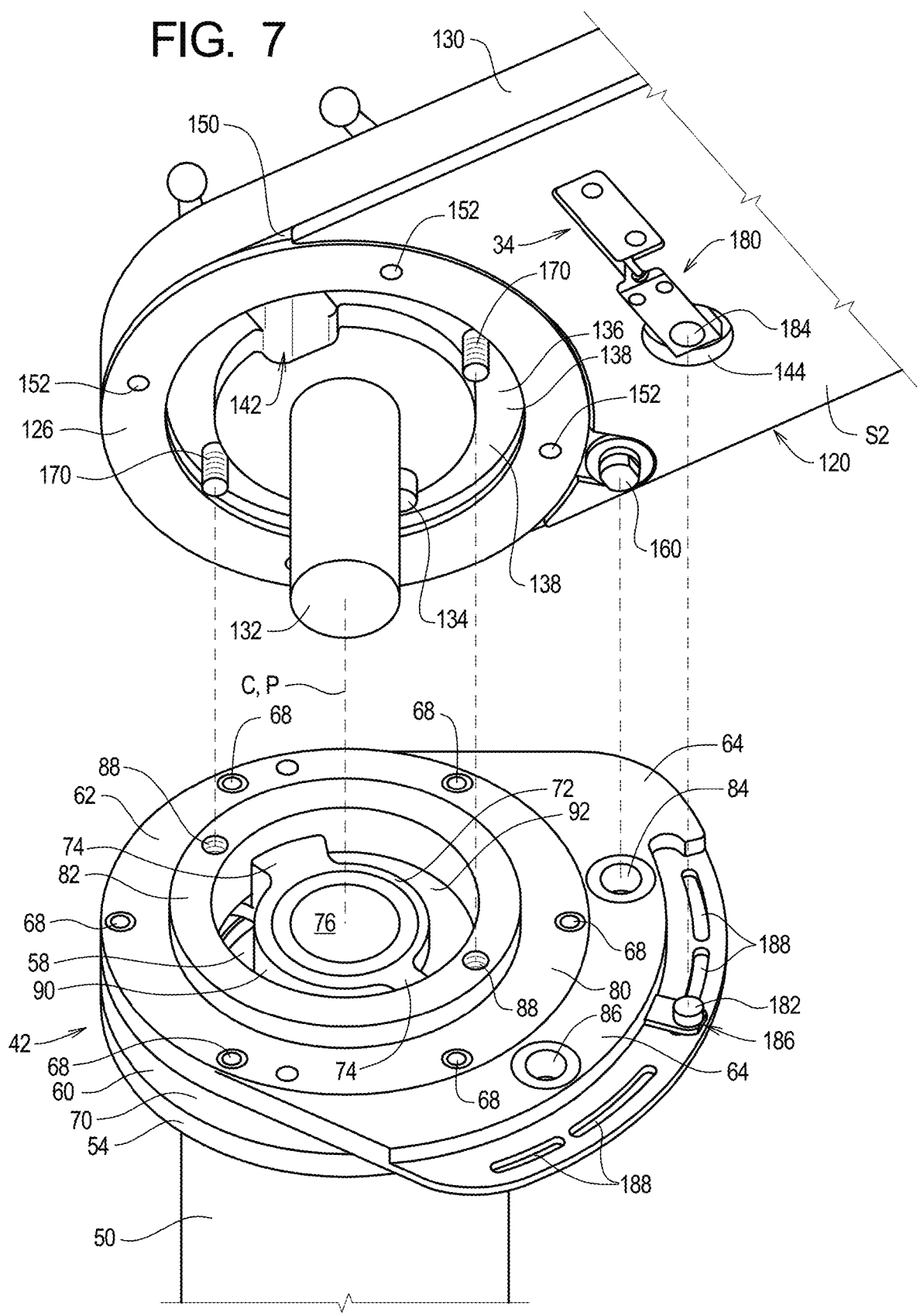
FIG. 7 is a perspective view illustrating alignment of the example platform assembly with the first example base assembly when the first example support system supports the robot arm system in an operational position.
Figure 8:
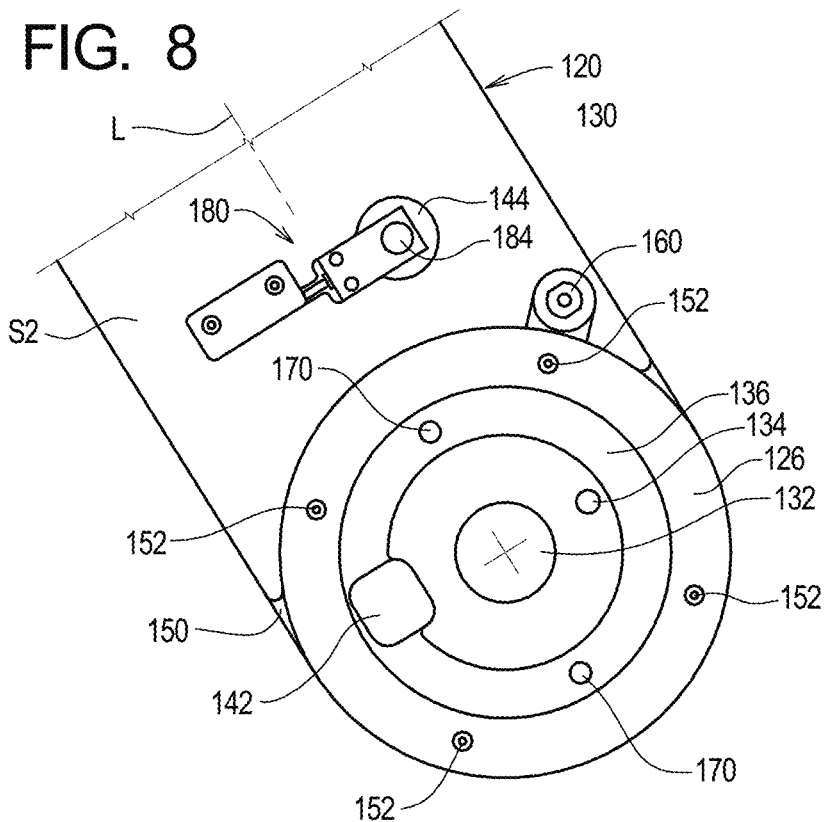
FIG. 8 is a bottom plan view of the example platform assembly taken along lines 8-8 in FIG. 5.
Figure 9:
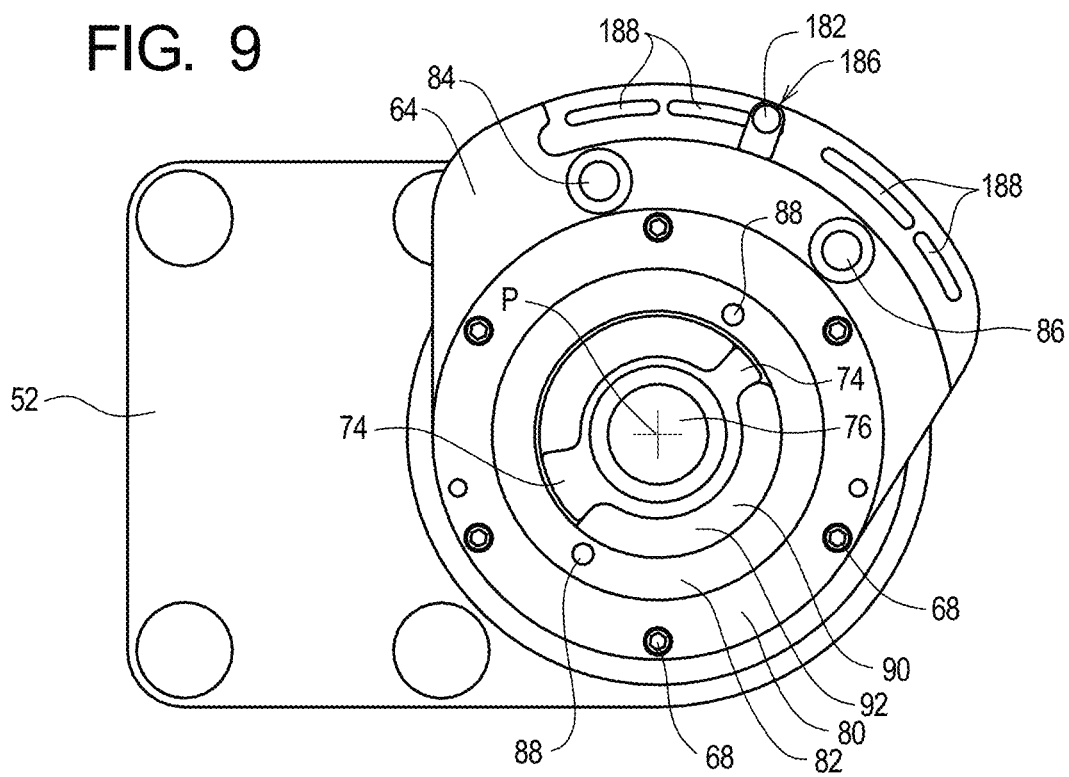
FIG. 9 is a top plan view of the first example base assembly taken along lines 9-9 in FIG. 5.
Figure 10:
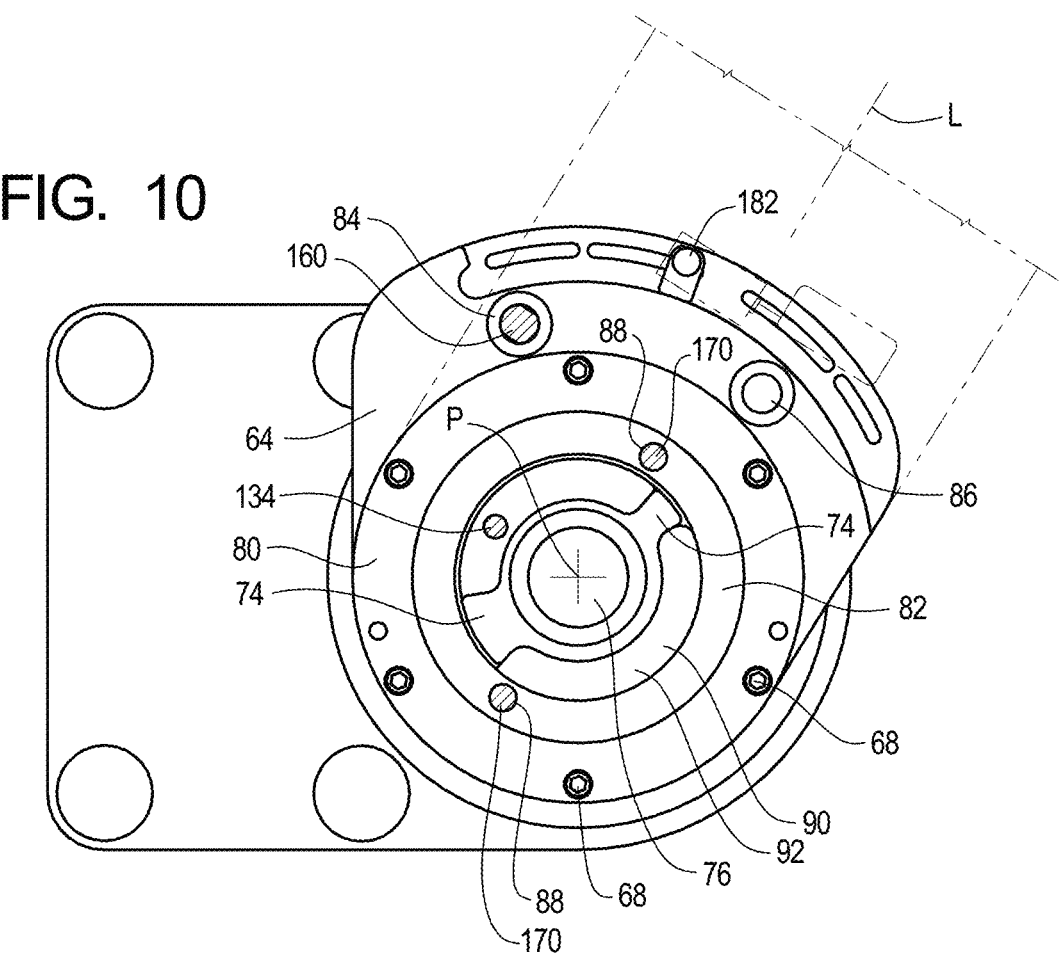
FIG. 10 is a top plan view with broken lines indicating the relationship of the example platform assembly and the first example base assembly when the first example support system is in a first configuration.
Figure 11:
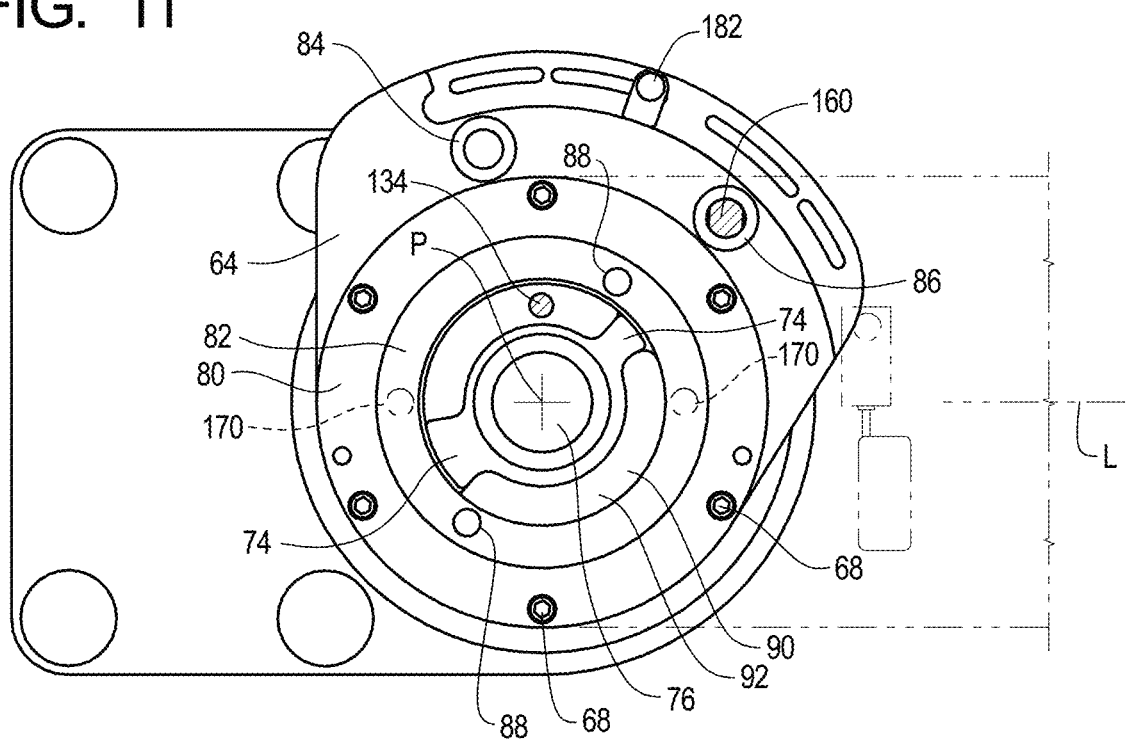
FIG. 11 is a top plan view with broken lines indicating the relationship of the example platform assembly and the first example base assembly when the first example support system is in a second configuration.

FIGS. 7 and 8 illustrate that the example locating system 34 comprises a sensor assembly 180 and a reference member 182. The example sensor assembly 180 comprises a locating sensor 184 and associated electronics and wiring. The example reference member 182 is supported by a locating assembly 186 that engages locating slots 188 formed in the locating structure 64 of the bearing plate assembly 42. In particular, the locating assembly engages locating slots 188 to allow the position of the reference member 182 to be moved during calibration of the robot arm system 24.

The example platform member 120 further defines a robot arm access opening 190 covered by a robot arm access opening cover plate 192. The arm access opening 190 allows access to the bottom of the robot arm system 24 for installation, maintenance, and servicing of the robot arm system 24. The robot arm access opening cover plate 192 is secured to the bottom surface S2 of the platform member 120 to inhibit access to the robot arm access opening 190.

The example platform member 120 further comprise a protection rail 194 to inhibit contact between the example robot arm system 24 and objects or persons in the surrounding environment.

To assemble the example support system 22, the example platform assembly 32 is arranged such that the pivot member 132 of the example platform assembly 32 is within the pivot opening 76 of the collar portion 72 of the pivot ring 60. So arranged, the pivot ring 60 supports the platform member 120 for pivoting movement relative to the first example base assembly 30. The example pivot opening 76 defined by the collar portion 72 of the pivot ring 60 is sized and dimensioned to receive the example pivot member 132 such that the cylinder axis C is substantially aligned with the pedestal axis P. The example platform guide recess 136 is further sized and dimensioned to receive the example guide ring 82 defined by the bearing ring 62 to ensure that the cylinder axis C is substantially aligned with the pedestal axis P.

Figure 12:
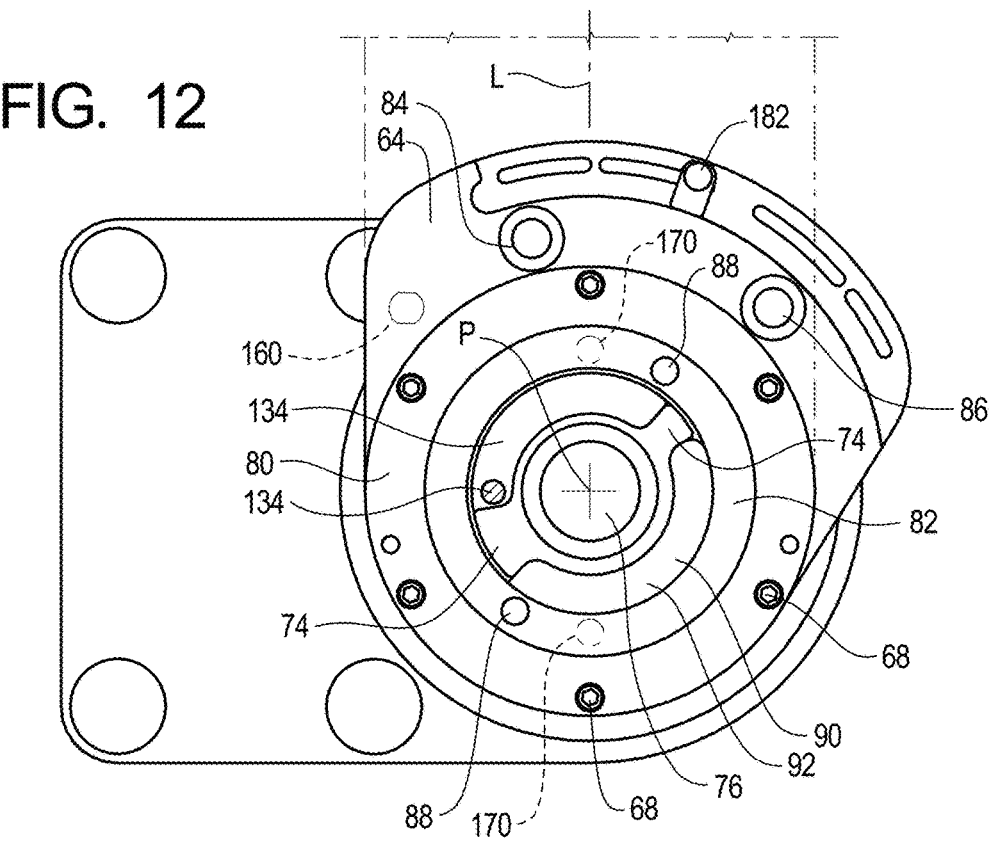
FIG. 12 is a top plan view with broken lines indicating the relationship of the example platform assembly and the first example base assembly when the first example support system is in a third configuration.
Figure 13:
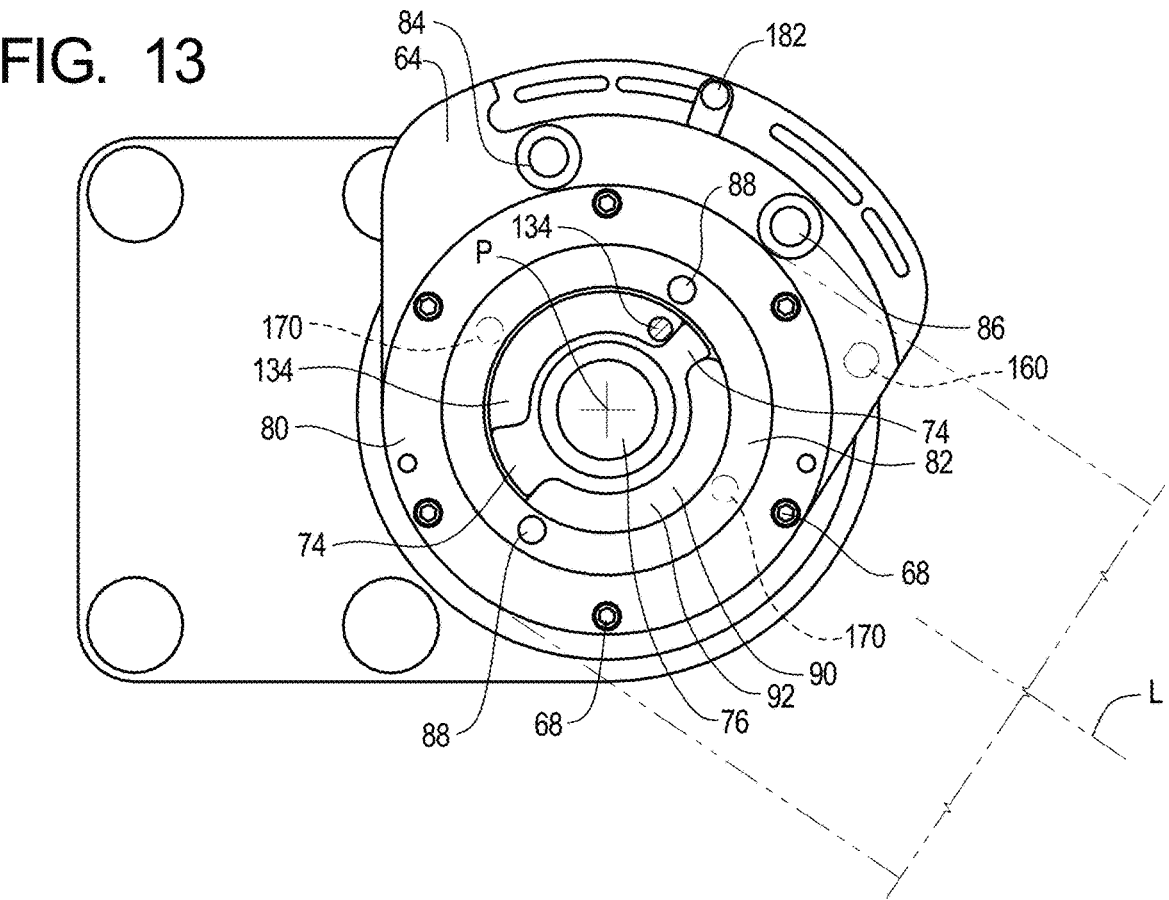
FIG. 13 is a top plan view with broken lines indicating the relationship of the example platform assembly and the first example base assembly when the first example support system is in a fourth configuration.

With the pivot member 132 arranged within the pivot opening 76, the stop projection 134 extends from the platform member 120 and into the stop chamber 92 as shown in FIGS. 10-13. FIGS. 12 and 13 illustrate that the stop projection 134 engages the stop wings 74 to limit rotation of the platform member 120 relative to the first example base assembly 30.

Further, when the platform member 120 is in a desired angular orientation relative to the first example base assembly 30 as depicted in FIG. 7, the robot system 20 is in an operating position. With the robot system 20 in the operating position, the example cam pin 160 is aligned with the first locating opening 84 and the example anchor bolts 170 are aligned with the anchor openings 88. To place the support system 22 in an anchored configuration, the example cam pin 160 may be arranged in its extended position to engage the first locating opening 84 and the example anchor bolts 170 may be threaded into their extended positions to threadingly engage the anchor openings 88. During normal use of the robot system 20 in the operating position and in the anchored configuration, the platform member 120 rigidly supports the robot arm system 24 in a desired working orientation relative to the workspace 28 in which the robot arm system 24 is intended to operate.

To move the platform member from the operating position to a stowed position, the platform assembly is placed in an un-anchored configuration. To place the robot system 20 in an un-anchored configuration, the example cam pin 160 will be arranged in its retracted position, and thereby disengaged from the first locating opening 84, and the example anchor bolts 170 are threaded into their retracted positions, and thereby disengaged from the anchor openings 88. In the un-anchored configuration, the example platform member 120 may be rotated from the operating position to the stowed position. In the stowed position, the cam pin 160 is aligned with the second locating opening 86, and displacement of the cam pin 160 into its extended position inhibits movement of the platform member 120 out of the stowed position.

The example locating system 34 is configured to prevent operation of the robot system 20 when the platform member 120 is not in the operating position. The locating sensor 184 is fixed relative to the platform member 120, and the reference member 182 is movably secured relative to the first example base assembly 30. When the locating sensor 184 is in a predetermined working orientation relative to the reference member 182, the locating sensor 184 generates an alignment signal. When the locating sensor 184 is not in the working orientation relative to the reference member 182, the locating sensor 184 does not generate the alignment signal. Based on presence or absence of the alignment signal, the robot system may be configured to allow or prevent, respectively, operation of the robot arm system. The example locating sensor 184 is a magnetic sensor, but optical and mechanical sensor may be used in addition or instead.

The example support system defines a wiring path that extends from the connector assembly 56, through the pedestal chamber 58, through the pedestal upper wiring portal 90, through the platform wiring portal 142, through the wiring chase 140, to the arm access opening 190, and to the robot arm system 24. The stop projection 134 engages the stop wings 74 to inhibit excessive deformation (e.g., twisting) of any wires extending along the wiring path through the pedestal upper wiring portal 90.

Figure 14:
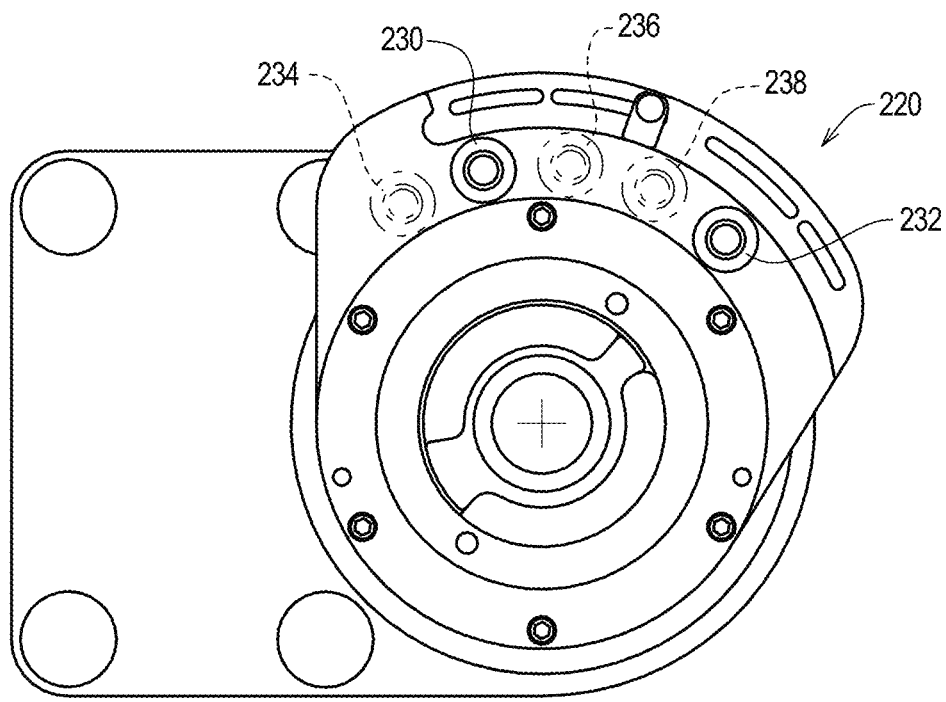
FIG. 14 is a top plan view of a second example base assembly with broken lines indicating possible locations of additional or alternate locating openings.

FIG. 14 illustrates a second example base assembly 220 that is in all respects the same as the first example base assembly 30 except that, in addition to first and second locating openings 230 and 232, the second example base assembly 220 comprises third, fourth, and fifth locating openings 234, 236 238 that allow the cam locator assembly to fix a location of the platform member in three additional positions.

What is claimed is:

1. A support system for supporting a robot arm system in an operating configuration and a stowed configuration relative to a workspace, the support system comprising:
   a base assembly adapted to be secured to a structural surface, the base assembly defining a pivot opening, at least one locating opening, at least one anchor opening, and a pedestal axis;
   a platform assembly adapted to support the robot arm system, the platform assembly comprising a pivot member;
   a locator assembly; and
   at least one anchor assembly; whereby
   the platform is supported by the base assembly and configured to support the robot arm system such that the robot arm system is offset from the pedestal axis;
   the pivot opening is sized and dimensioned to receive the pivot member such that the platform assembly is movable between the operating configuration and the stowed configuration relative to the workspace;
   the locator assembly is configured to engage the locating opening to locate the platform assembly in the operating configuration relative to the base assembly; and
   the at least one anchor assembly engages the at least one anchor opening to rigidly support the platform assembly in the operating configuration.

2. A support system as recited in claim 1, further comprising a locating system for generating an alignment signal when the robot arm system is in an operating position associated with the operating configuration.

3. A support system as recited in claim 1, in which the locator assembly comprises at least one cam locator assembly for engaging the at least one locating opening to fix a location of the platform assembly relative to the base assembly.

4. A support system as recited in claim 1, in which the at least one anchor assembly comprises at least one anchor bolt assembly for threadingly engaging the at least one anchor opening to fix a location of the platform assembly relative to the base assembly.

5. A support system as recited in claim 1, in which:
   the locator assembly comprises at least one cam locator assembly for engaging the at least one locating opening to fix a location of the platform assembly relative to the base assembly; and
   the at least one anchor assembly comprises at least one anchor bolt assembly for threadingly engaging the at least one anchor opening to fix a location of the platform assembly relative to the base assembly.

6. A support system as recited in claim 1, in which the base assembly further comprises:
   a pedestal assembly; and
   a bearing plate assembly supported by the pedestal assembly, wherein
   the bearing plate assembly is configured to support the platform assembly.

7. A support system as recited in claim 1, in which the platform assembly defines a wiring chase and a platform wiring portal for allowing wiring to extend between the base assembly and the robot arm system supported by the platform assembly.

8. A method of supporting a robot arm system in an operating configuration and a stowed configuration relative to a workspace, the method comprising the steps of:
   providing a base assembly defining a pivot opening, at least one locating opening, at least one anchor opening, and a pedestal axis;
   securing the base assembly to a structural surface;
   providing a platform assembly comprising a pivot member, where the pivot opening is sized and dimensioned to receive the pivot member;
   arranging the platform assembly relative to the base assembly such that the pivot opening receives the pivot member and the platform is supported by the base assembly to support the robot arm system such that the platform assembly is movable relative to the base assembly and the robot arm system is offset from the pedestal axis;
   supporting the robot arm system on the platform assembly;
   displacing the platform assembly relative to the base assembly to move the robot arm system between the operating configuration and the stowed configuration relative to the workspace;
   arranging a cam locator assembly to engage the locating opening to locate the platform assembly in the operating configuration relative to the base assembly; and
   engaging the at least one anchor assembly with the at least one anchor opening to rigidly support the platform assembly in the operating configuration.

9. A method as recited in claim 8, further comprising the step of generating an alignment signal when the robot arm system is in an operating position associated with the operating configuration.

10. A method as recited in claim 8, in which the step of arranging the cam locator assembly to locate the platform assembly relative to the base assembly comprises the step of providing at least one cam locator assembly.

11. A method as recited in claim 8, in which the step of engaging the at least one anchor assembly with the at least one anchor opening comprises the step of providing at least one anchor bolt assembly.

12. A method as recited in claim 8, in which the step of fixing the location of the platform assembly relative to the base assembly comprises the steps of:

arranging the cam locator assembly to locate the platform assembly relative to the base assembly comprises the step of providing at least one cam locator assembly; and engaging the at least one anchor assembly with the at least one anchor opening comprises the step of providing at least one anchor bolt assembly.

13. A method as recited in claim 8, in which the step of providing the base assembly further comprises the steps of:

providing a pedestal assembly configured to support the platform assembly; and supporting a bearing plate assembly on the pedestal assembly.

14. A method as recited in claim 8, in which the step of providing the platform assembly comprises the steps of:

defining a wiring chase and a platform wiring portal in the platform assembly; and extending wiring between the robot arm system supported by the platform assembly and the base assembly through the wiring chase and the platform wiring portal.

15. A support system for supporting a robot arm system in an operating configuration and a stowed configuration relative to a workspace, the support system comprising:

a base assembly adapted to be secured to a structural surface, the base assembly defining a pivot opening, at least one locating opening, at least one anchor opening, and a pedestal axis;

a platform assembly adapted to support the robot arm system, the platform assembly comprising a pivot member;

a fixing assembly for fixing a location of the platform assembly relative to the base assembly comprising
a locator assembly, and
at least one anchor assembly; whereby the pivot opening is sized and dimensioned to receive the pivot member such that the platform assembly is movable between the operating configuration and the stowed configuration relative to the workspace;

the cam locator assembly is configured to engage the locating opening to locate the platform assembly in the operating configuration relative to the base assembly; and the at least one anchor assembly engages the at least one anchor opening to rigidly support the platform assembly in the operating configuration.

16. A support system as recited in claim 15, further comprising a locating system for generating an alignment signal when the robot arm system is in an operating position associated with the operating configuration.

17. A support system as recited in claim 15, in which comprises:

the locator assembly comprises at least one cam locator assembly for fixing a location of the platform assembly relative to the base assembly; and the at least one anchor assembly comprises at least one anchor bolt assembly for fixing a location of the platform assembly relative to the base assembly.

18. A support system as recited in claim 15, in which the base assembly further comprises:

a pedestal assembly; and a bearing plate assembly supported by the pedestal assembly, wherein the bearing plate assembly is configured to support the platform assembly.

19. A support system as recited in claim 15, in which the platform assembly defines a wiring chase and a platform wiring portal for allowing wiring to extend between the robot arm system supported by the platform assembly and the base assembly.

* * * * *